United States Patent
Greist et al.

(10) Patent No.: US 8,382,874 B2
(45) Date of Patent: Feb. 26, 2013

(54) AIR FILTER HAVING DIMENSIONAL EXTENDING TABS

(75) Inventors: Henry Greist, Gainesville, FL (US); Sanjeev Hingorani, Gainesville, FL (US)

(73) Assignee: Lennox Industries Inc., Richardson, TX (US)

( * ) Notice: Subject to any disclaimer, the term of this patent is extended or adjusted under 35 U.S.C. 154(b) by 292 days.

(21) Appl. No.: 12/824,739

(22) Filed: Jun. 28, 2010

(65) Prior Publication Data

US 2011/0314781 A1 Dec. 29, 2011

(51) Int. Cl.
*B01D 39/00* (2006.01)

(52) U.S. Cl. ............... 55/496; 55/422; 55/490; 55/511; 55/497; 55/DIG. 31

(58) Field of Classification Search ............. 55/422, 55/490, 496, 497, 511, DIG. 31
See application file for complete search history.

(56) References Cited

U.S. PATENT DOCUMENTS

| | | | | |
|---|---|---|---|---|
| 192,200 | A * | 6/1877 | Underwood | 160/228 |
| 2,004,098 | A * | 6/1935 | Andrews | 24/17 R |
| 2,405,293 | A * | 8/1946 | Dahlman | 55/529 |
| 2,597,927 | A * | 5/1952 | Endres | 96/17 |
| 2,869,694 | A * | 1/1959 | Breckheimer | 52/658 |
| 2,992,701 | A * | 7/1961 | White | 55/309 |
| 3,246,457 | A | 4/1966 | De Baun | |
| 3,970,440 | A * | 7/1976 | Copenhefer et al. | 55/501 |
| 3,992,173 | A * | 11/1976 | Wharton et al. | 55/501 |
| 4,086,071 | A * | 4/1978 | Champlin | 55/501 |
| 4,105,423 | A * | 8/1978 | Latakas et al. | 55/501 |
| 4,171,211 | A * | 10/1979 | Carter | 55/493 |
| 4,323,379 | A * | 4/1982 | Shearin | 55/511 |
| 4,372,763 | A * | 2/1983 | Champlin et al. | 55/501 |
| 4,561,587 | A * | 12/1985 | Wysocki | 229/169 |
| 4,570,844 | A * | 2/1986 | Wysocki | 229/100 |
| 4,636,233 | A * | 1/1987 | Lizmore | 55/501 |
| 4,673,492 | A * | 6/1987 | Jasinski | 209/477 |
| 4,976,753 | A * | 12/1990 | Huang | 96/58 |
| 7,118,610 | B2 * | 10/2006 | Lipner | 55/495 |
| 7,537,632 | B2 * | 5/2009 | Miller et al. | 55/501 |
| 7,674,436 | B1 * | 3/2010 | Feldman et al. | 422/121 |
| 2006/0168925 | A1 * | 8/2006 | Whittemore | 55/490 |
| 2007/0175192 | A1 * | 8/2007 | Niakan et al. | 55/486 |
| 2009/0320426 | A1 * | 12/2009 | Braunecker et al. | 55/511 |

* cited by examiner

*Primary Examiner* — Jason M Greene
*Assistant Examiner* — Anthony Shumate

(57) ABSTRACT

There is provided herein an air filter that includes one or more foldable extension flaps that can be folded and secured against the frame to provided an extend thickness dimension for the frame of the air filter, which allows the same filter to be used in either a smaller or larger filter slot within an HVAC system.

21 Claims, 9 Drawing Sheets

AIR FILTER HAVING DIMENSIONAL EXTENDING TABS

TECHNICAL FIELD

This application is directed, in general, to air filters for a heating ventilation air conditioning (HVAC) system and, more specifically, to an air filter having foldable extension flaps that allow a dimension of the air filter to be extended.

BACKGROUND

HVAC manufacturers constantly strive to meet customer and environmental demands in providing energy efficient and compact HVAC systems. To that end HVACs are constantly undergoing re-engineering efforts to design units to use less energy, run more efficiently, and take up less space. As such, the internal dimensions in which the various HVAC components are housed often change. One component that is typically common to most HVAC systems, including air purification systems, is an air filter that is used to help filter out dirt, allergens, bacteria, and other particles from the air.

Typically, the HVAC system will include one or more of these filters and will have slots in which the filters are held in place in the return air flow. As re-designs occur, for the reasons noted above, the dimensions of the air filters are typically reduced in size to accommodate the reduce dimensions of the air filter slot within the HVAC system. In such instances, manufactures and their customers must obtain a different size of filter to accommodate the new design. In the event that the customer has both older and newer versions of the HVAC system, they must obtain both sizes of filters, and if the manufacture also provides these filters to their customers, they must also manufacture and inventory both sizes.

SUMMARY

One aspect provides an air filter that comprises a frame having a length and a width and at least one foldable extension flap attached to the frame and extending along at least one side of either the length or the width of the frames. The frame further has at least one tab slot located along the at least one side of either the length or the width, and the extension flap has at least one tab located along an edge thereof configured to be received within the at least one tab slot. The air filter further comprises a filter membrane contained within the frame.

Another embodiment provides a method of fabricating an air filter. This method embodiment comprises forming a frame having a length and a width and at least one foldable extension flap attached to the frame and extending along at least one side of either the length or the width, forming at least one tab slot along the at least one side of either the length or the width. The extension flap has at least one tab located along an edge thereof configured to be received within the at least one tab slot. The method further includes placing a filter membrane within the frame.

In another embodiment, an air filter is provided that comprises a frame having a length and a width and at least one foldable extension flap attached to the frame and extending along at least one side of either the length or the width. The at least one extension flap has a width sufficient to allow a portion of the extension flap to overlap and abut an edge of the frame when the at least one extension flap is folded along the crease lines. The filter further includes a filter membrane contained within the frame.

BRIEF DESCRIPTION

Reference is now made to the following descriptions taken in conjunction with the accompanying drawings, in which.

DETAILED DESCRIPTION

Figure 1:
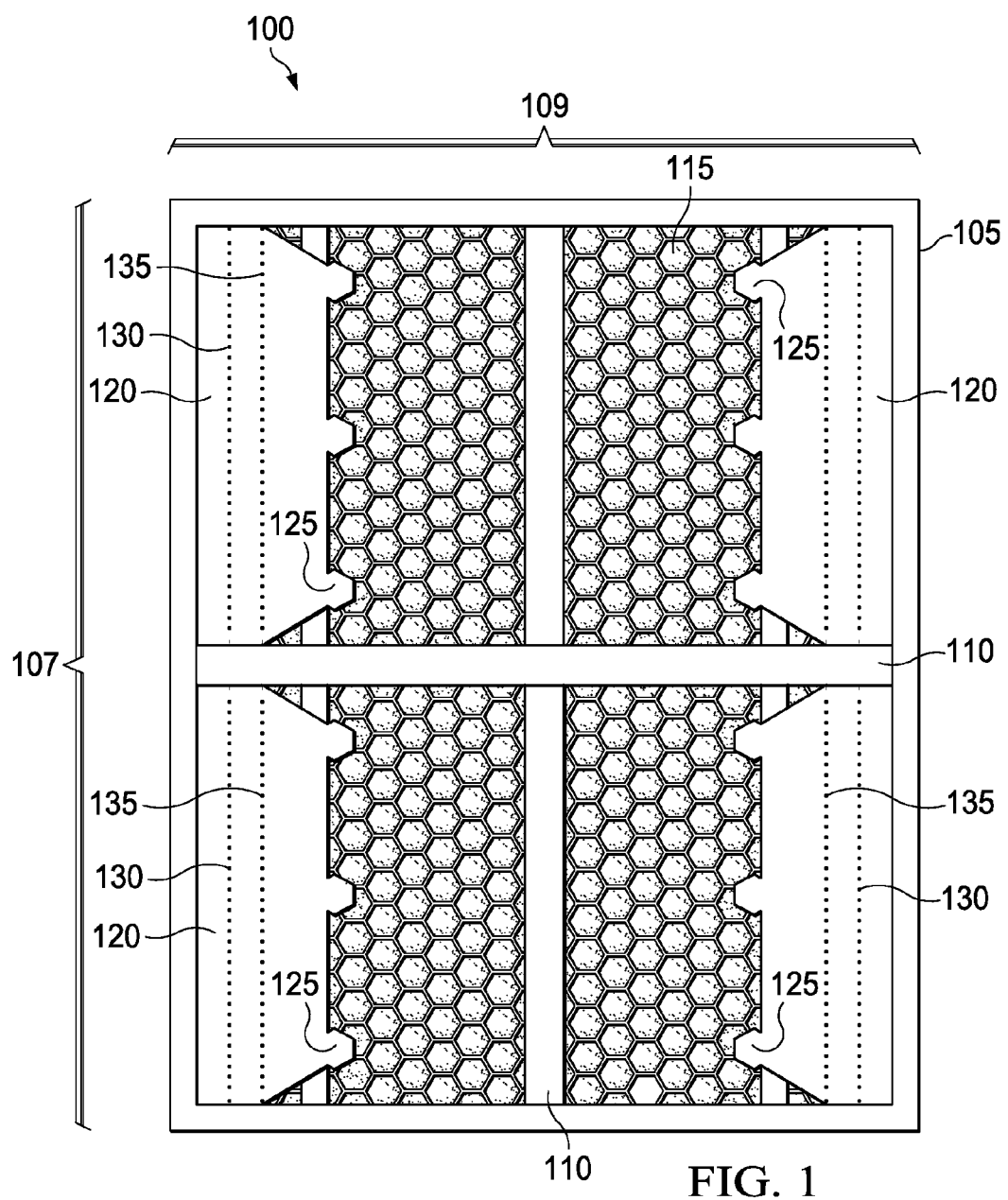
FIG. 1 illustrates one embodiment of an air filter having a four extension flap configuration.

FIG. 1 illustrates one embodiment of the air filter 100 presented herein. The air filter 100 provides advantages over conventional air filters in that the thickness dimension can be easily adjusted to allow the air filter 100 to be used in either a smaller or larger filter slot space within an HVAC system. Often HVAC manufactures are driven by market conditions to produce more energy efficient and compact units. In such red-design efforts, internal dimensions are often changed to reduce the overall size of HVAC chassis for cost reduction and to meet reduced space requirements. In such cases, internal dimensions, such as the filter slot, may also be changed. In conventional situations when design changes occur, the manufactures simply require customers to purchase either larger or smaller filters, to conform to the new filter slot dimensions. Moreover, if the manufacture commercially provides the filter to its customers, the manufacture would need to keep inventory on hand for both designs, thereby increasing inventory costs and utilizing more natural resources to make both, sizes of filters.

The present disclosure uniquely addresses these problems in that it allows the thickness dimension of the filter to be adjusted by using a simple extension flap, which allows the use of the same filter in either dimensional configuration. For example, in past designs, the filter slot of the HVAC or air purification cabinet, might have required a filter having a thickness of two inches, while a new design might require a filter having only a one inch thickness. In such instances, two different filters would have to be made and inventoried to make certain that both units would have replacement filters available. However given the present disclosure, the main frame of the filter can be designed to accommodate the one inch design and by way of the flap extension, also accommodate the two inch filter slot, thereby allowing the same filter to be used in either design. Further, in most embodiments, there is no need for mechanical fasteners that can be associated with some conventional air filter, which reduces fabrication costs.

As shown in the embodiment of FIG. 1, the air filter comprises a frame 105 that has a length 107 and a width 109. It should be understood that the frame 105 is not limited to any type of geometric configuration and may include three, four, or more sides. In the illustrated embodiment, which is but one example, the length 107 has the greater dimension. The material that comprises the frame 105 may vary and may be made of materials known to those skilled in the art. For example, the frame 105 may be comprised of a semi-rigid cardboard or similar composite material, or hard plastic. In many embodiments, however, the frame 105 will be comprised of a cardboard or similar material that can be easily folded. The frame 105 may include cross members 110 that provide additional support for the air filter 100 and may give further support to a filter membrane 115 contained within the frame 105.

In one embodiment, the filter membrane 115 may be comprised of an aluminum mesh material, and when such embodiments are present, the aluminum mesh may be a honeycomb mesh as shown in FIG. 1, or alternatively, the aluminum mesh may be repeating patterns of "S" shaped aluminum strips. However, other types of materials and configurations are also within the scope of this disclosure. In yet other embodiments, the filter membrane 115 may be comprised of any type of known filter material, such as carbon materials, fibrous polymer materials, or pleated paper. In those embodiments where the filter membrane 115 is aluminum or similar types of materials, the filter membrane 115 may further include a titanium oxide coating. These filters are particularly useful in air purifications systems that are often used in conjunction with both commercial and residential HVAC systems.

The embodiment shown in FIG. 1 further includes at least one extension flap 120 located along at least the length 107 or width 109. When in an unfolded position, the extension flap 120 partially extends over a portion of the filter membrane 115 as illustrated in the embodiment of FIG. 1. While the embodiment of FIG. 1 includes four such extension flaps 120 located along the length 107 of the frame 105, it should be understood that the air filter 100 may have one to two or more extension flaps 120 along either or both of its length or width dimensions. In those embodiments where the composition of the extension flap 120 is different from the composition of the frame 105, the extension flaps 120 may be attached to the frame 105 by an adhesive tape, glue, or other mechanical means.

In embodiments where two extension flaps 120 are present, the extension flaps 120 may be located about a center of either the length or width of the frame 105. Alternatively, one extension flap 120 may be located on one side and at one end of the frame 105, while the other extension flap may be located on the opposite side and end of the frame 105. However, the four extension flap configuration that is shown is advantageous due to additional stability associated with the four flap configuration. The extension flap 120, in this embodiment, also includes one or more tabs 125. As explained below, each of the tabs 125 that are present are configured to be received in a tab slot located along an edge of the frame 105. In one aspect, each extension flap 120 that is present may include two to three or more crease lines 130, 135 along which the extension flap 120 may easily be folded in a manner discussed below.

Figure 2:
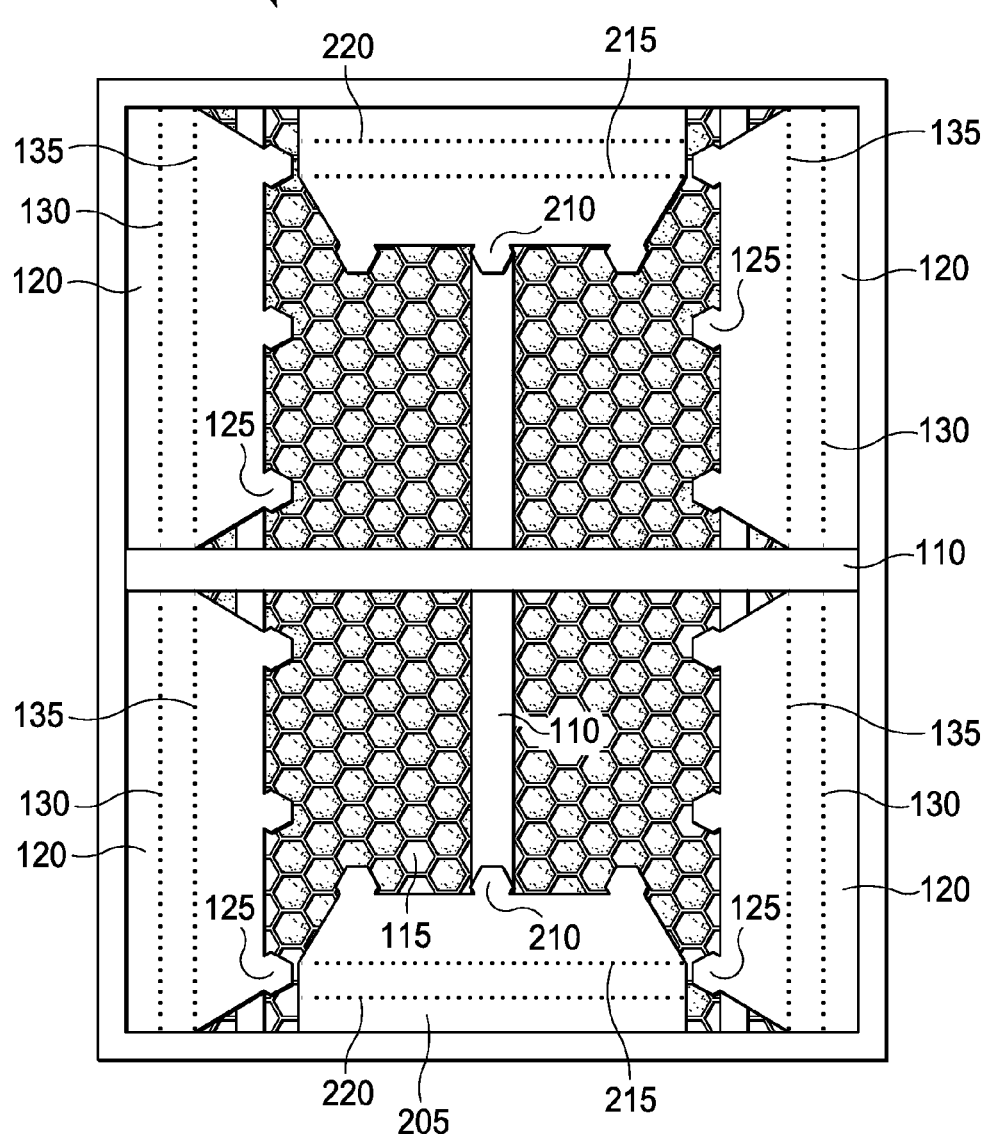
FIG. 2 illustrates another embodiment of an air filter having a six extension flap configuration.

FIG. 2 illustrates another embodiment 200 of the filter of FIG. 1 where extension flaps 120, 205 are located along both the length and width of the filter 200 on both sides and ends of the filter 200. As with the previous embodiment, the extension flaps 120, 205 include one or more tabs 125, 210, and in certain embodiments, they may also include crease lines 130, 135 and 215, 220, respectively, along which the extension flaps 120, 205 may easily be folded. The filter 200 may include one flap 120 located along one side and at one end of the filter 200, while the flap 205 may be located on the opposite end of the filter 200, as shown. Alternatively, the filter 200 may include the six flap configuration as shown in FIG. 2, and in another embodiment, the filter 200 may have a four extension flap configuration wherein the extension flaps 120, 205 are respectively located at a center of the length and width of the frame 105.

Figure 3:
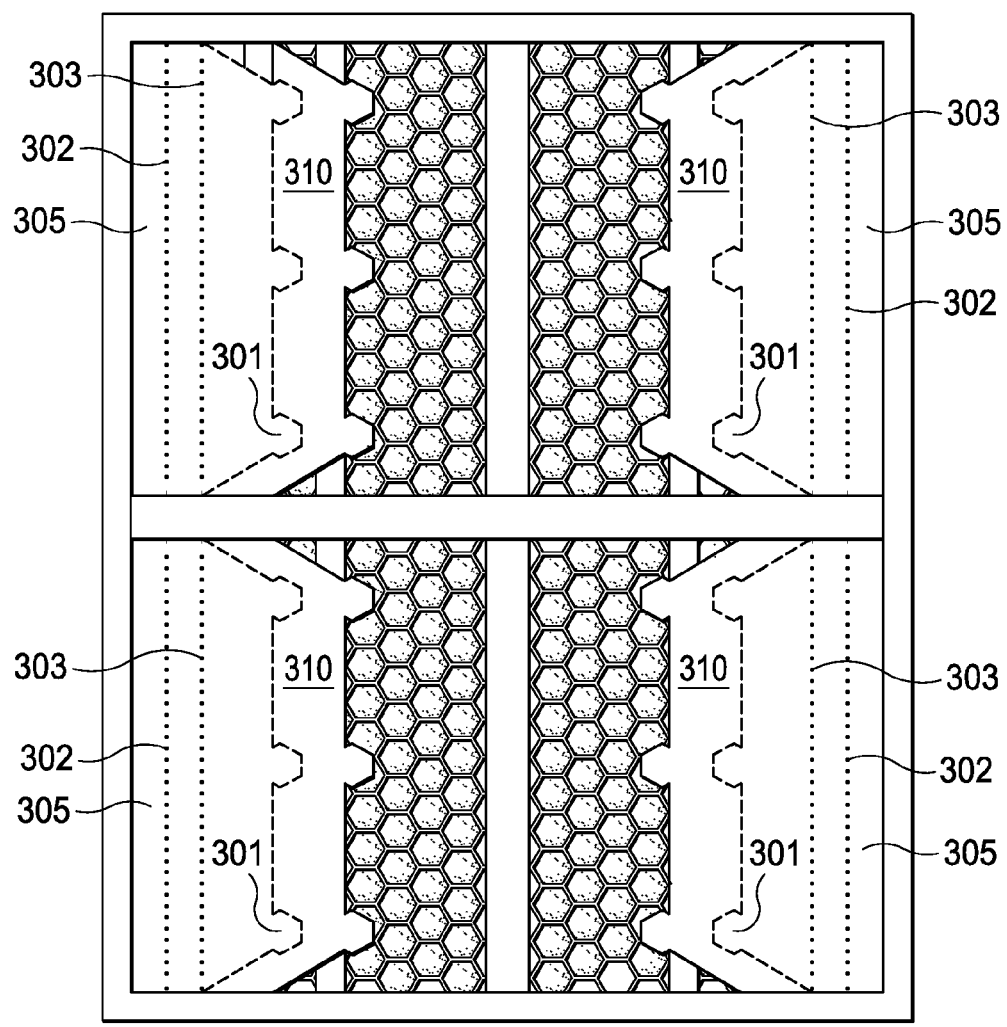
FIG. 3 illustrates another embodiment where the extension flaps include a removable section.

FIG. 3 illustrates yet another embodiment 300 of the air filter 100 of FIG. 1. In this embodiment and in addition to tabs 301 and crease lines 302, 303, the extension flaps 305 include a removable section 310 that allows the dimensions of the flaps 305 to be further adjusted. In one embodiment, the removable sections 310 may include a perforated line (shown by dashes) such that the removable section 310 of each flap 305 can be easily torn away along the perforations. In another embodiment, and in place of the perforations, a line along which one may cut the removable section 310 to remove it may be present. As with previous embodiments, various number combinations of flaps 305 and tabs 325 may be present consistent with the previously described embodiments.

Figure 4:
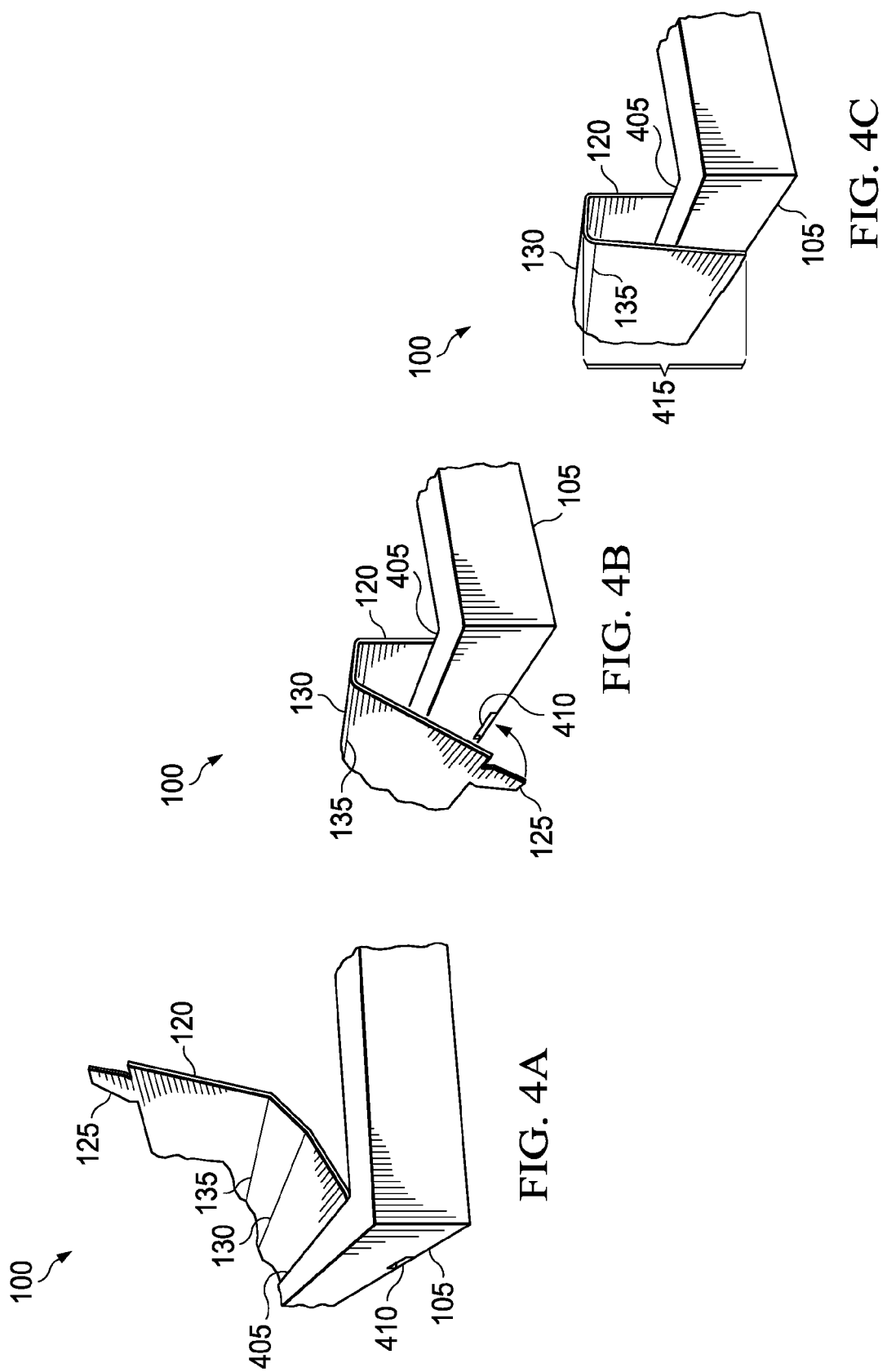
FIGS. 4A-4C illustrate the deployment of the extension flap to increase a dimension of the air filter.

FIGS. 4A-4C illustrate partial views of the embodiment of the air filter 100 illustrated in FIG. 1 and how the extension flap 120 can be folded to form an extended thickness dimension along the length 107 of the frame 105. As seen in FIG. 4A, the air filter 100 shows the extension flap 120 attached to the frame 105, a tab 125, and crease lines 130 and 135. The point at which the extension flap 120 is attached to the frame 105 serves as a third crease line 405. Also shown is an insertion slot 410 located on the edge of the frame 105 and at a location along the length 107 of the frame 105 that substantially aligns with the location of the tab 125 along that same length.

FIG. 4B illustrates the folding of the extension flap 120 along the crease lines 130, 135 and 405. At this point, the tab 125 would also be folded in the direction of the frame 105 and the insertion slot 410, as indicated by the arrow.

FIG. 4C illustrates the tab 125 inserted in the insertion slot 410, thereby extending the thickness dimension 415 of the air filter 100. In an advantageous embodiment, the tab 125 may have a configuration that allows it to lockingly engage the insertion slot 410 so that it does not easily slip out of the insertion slot 410 during use. In such instances, the material that comprises the tab 125 is flexible enough such that the outer edges of the tab 125 can be inserted into the insertion slot 410 and then expand against the inside edges of the insertion slot 410. Though this aspect is not shown, those skilled in the art would readily understand how the tab 125 would lockingly engage the insertion slot 410.

Figure 5:
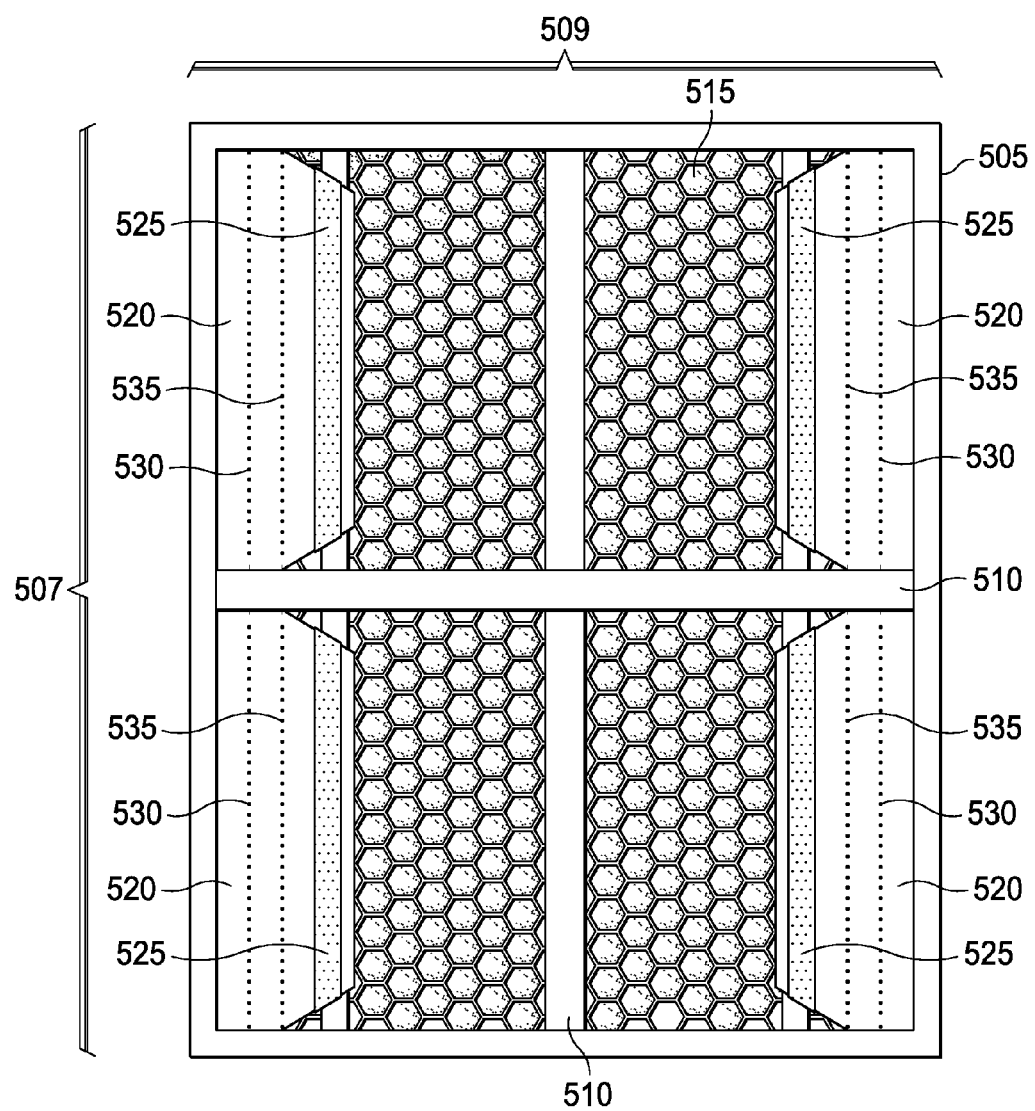
FIG. 5 illustrates another embodiment of the air filter that uses an adhesive strip to secure the extension flap against the frame of the air filter.

FIG. 5 illustrates another embodiment that may exclude the previously described tab and insertion slot configuration. Here, the air filter 500 comprises a frame 505 that has a length 507 and a width 509. It should be understood that the frame 505 is not limited to any type of geometric configuration and may include three, four, or more sides. In the illustrated embodiment, which is but one example, the length 507 has the greater dimension. The material that comprises the frame 505 may be the same as those previously described. The frame 505 may include cross members 510 that provide additional support for the air filter 500 and may give further support to a filter membrane 515 contained within the frame 505.

The filter membrane 515 may also be comprised of materials previously described with respect to other embodiments. In those embodiments where the filter membrane 515 is aluminum or similar types of materials, the filter membrane 515 may further include a titanium oxide coating.

The embodiment shown in FIG. 5 further includes at least one extension flap 520 located along at least the length 507 or width 509. When in an unfolded position, the extension flap 520 partially extends over a portion of the filter membrane 515 as illustrated in the embodiment of FIG. 5. While the embodiment of FIG. 5 includes four such extension flaps 520 located along the length 507 of the frame 505, it should be understood that the air filter 500 may have one to two or more extension flaps 520 along either or both of its length or width dimensions. In those embodiments where the composition of the extension flap 520 is different from the composition of the frame 505, the extension flaps 520 may be attached to the frame 505 by an adhesive tape, glue or other mechanical means. It should be further noted that the number and location of the extension flaps 520 may be the same as previously described embodiments.

The extension flap 520 does not necessarily include the tabs associated with previously described embodiments, though in certain configurations it may. In place of the tabs or in addition to them, an adhesive strip 525 may be located along the edge of the extension flap 520 that abuts or contacts the edge of the frame 505 when in the folded, deployed position. To protect the adhesive strip 525, a removable cover strip that can easily be pealed away from the adhesive strip 525 may also be included. In one aspect, each extension flap 520 that is present may include two to three or more crease lines 530, 535 along which the extension flap 520 may easily be folded in a manner discussed below.

Figure 6C:
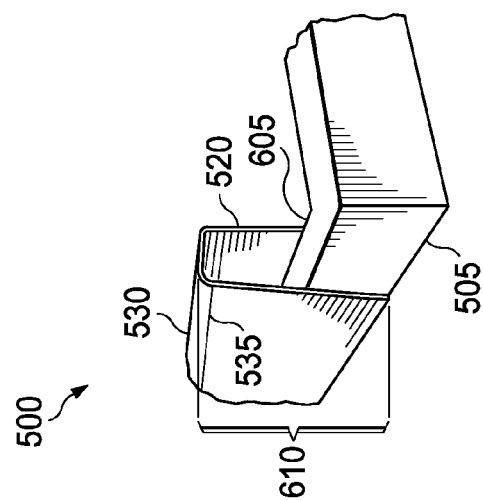
FIGS. 6A-6C illustrate the deployment of the extension flap to increase a dimension of the air filter.
Figure 6B:
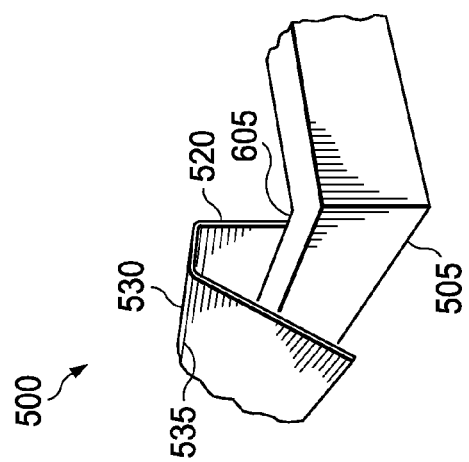
Figure 6A:
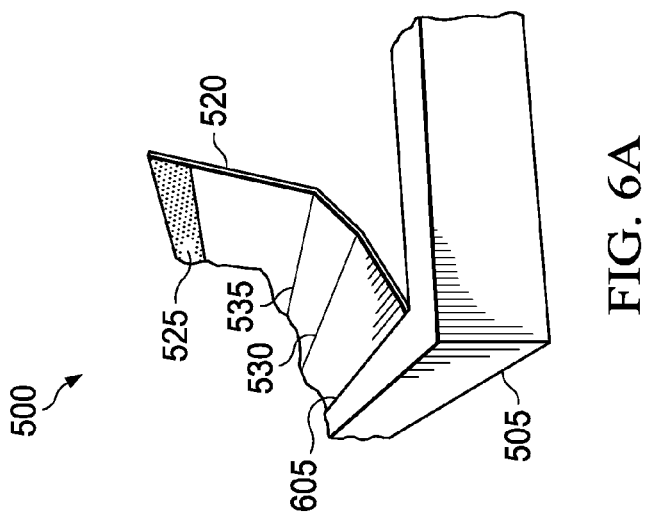

FIGS. 6A-6C illustrate partial views of the embodiment of the air filter 500 illustrated in FIG. 5 and how the extension flap 520 can be folded to form an extended thickness dimension along the length 507 of the frame 505. As seen in FIG. 6A, the air filter 500 shows the extension flap 520 attached to the frame 505, the adhesive strip 525, and optional crease lines 530 and 535. The point at which the extension flap 520 is attached to the frame 505 may serve as an optional third crease line 605.

FIG. 6B illustrates the folding of the extension flap 520 along the crease lines 530, 535 and 505. At this point, the adhesive strip 525 would be facing the edge of the frame 505, as shown.

FIG. 6C illustrates the adhesive strip 525 secured against the edge of the frame 505, thereby extending the thickness dimension 610 of the air filter 500.

Figure 7A:
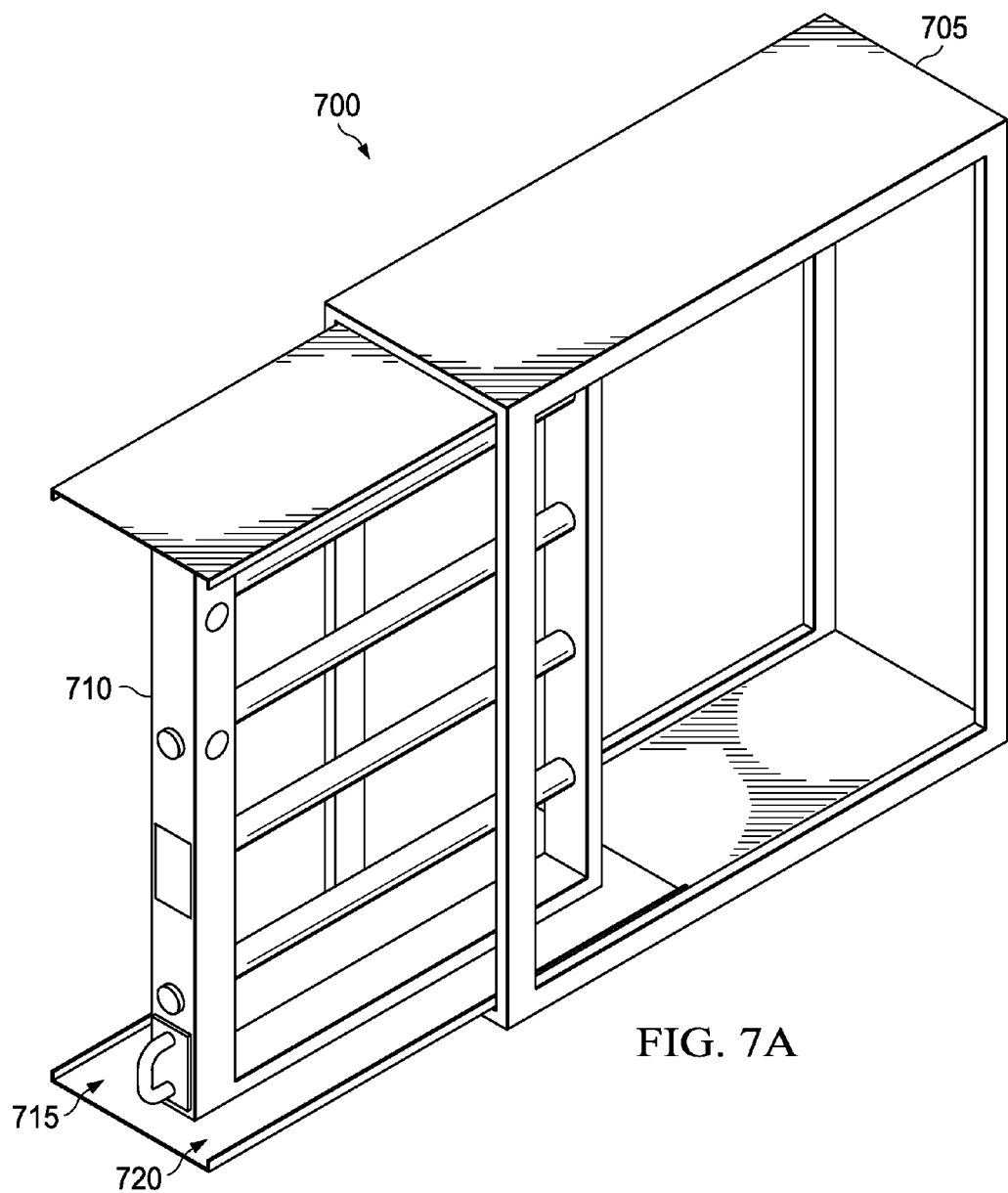
FIGS. 7A-7C illustrate different views of an HVAC system in which the filter can be used.
Figure 7B:
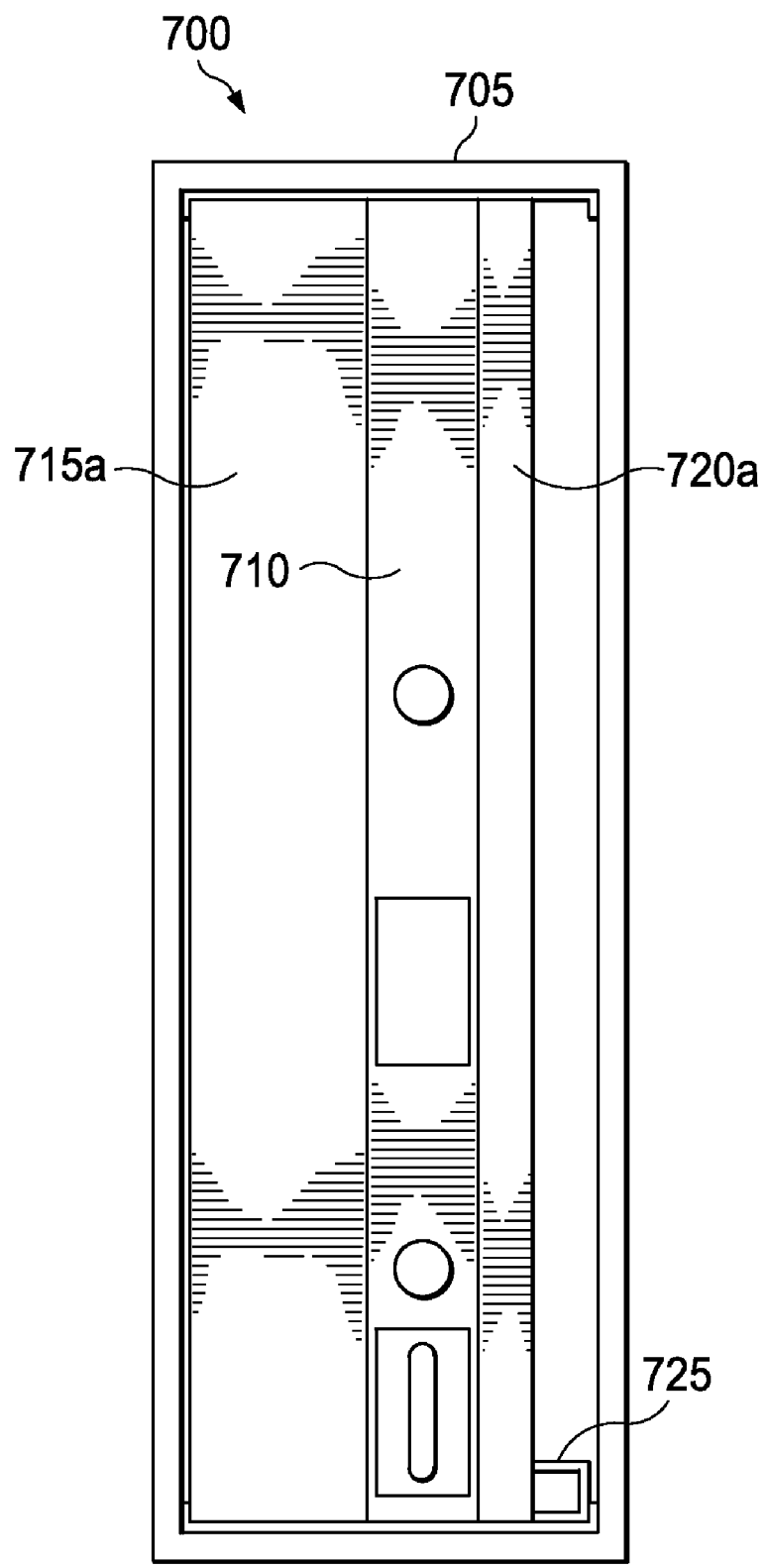
Figure 7C:
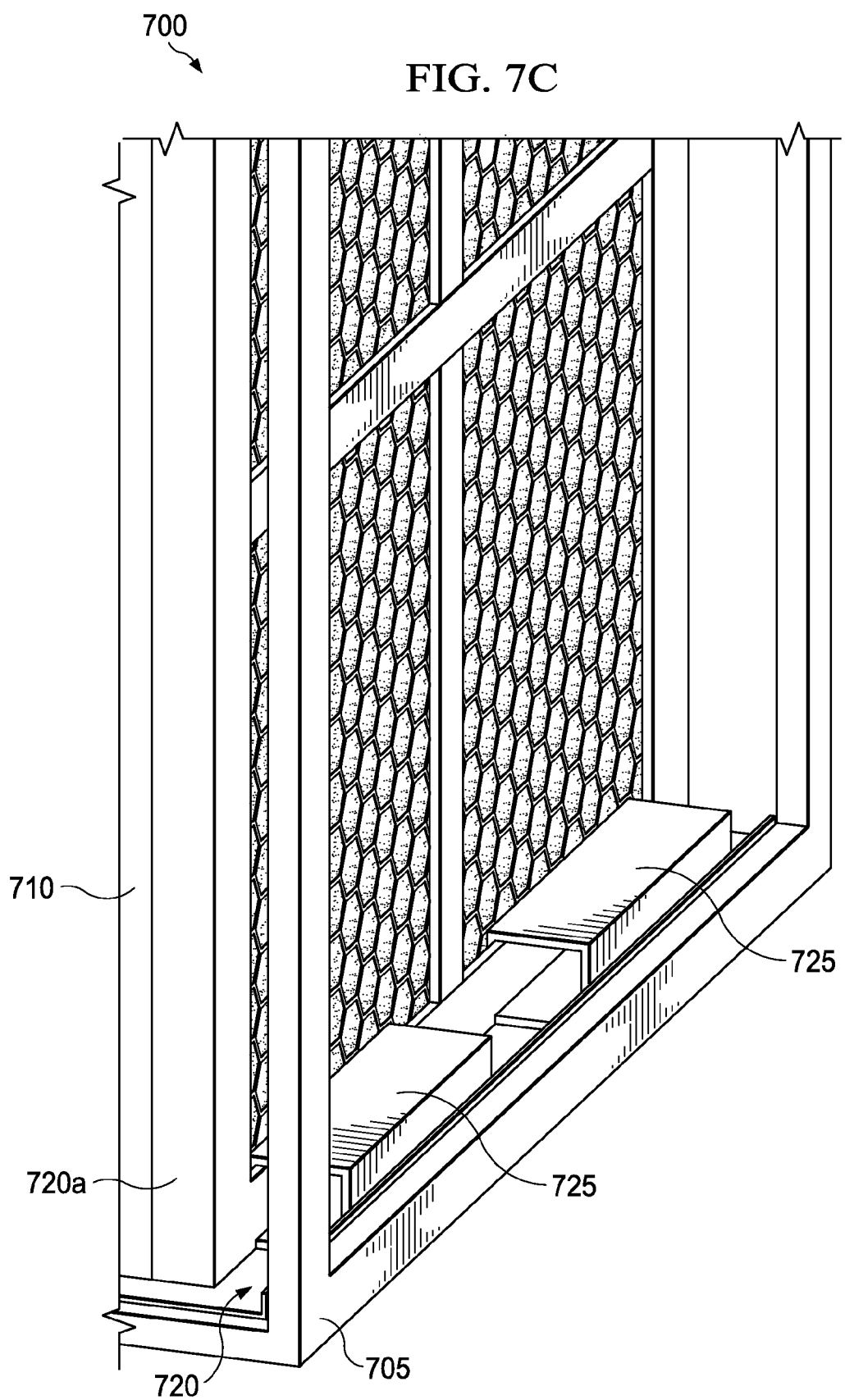

FIGS. 7A-7C illustrate examples of a HVAC system in which the various embodiments of the air filters, 100, 200, 300 and 500 may be used. FIG. 7A shows a conventional air purification system that may often form a portion of the HVAC system. These systems are well known but typically include a chassis 705, an ultra violet light assembly 710, a slot 715 configured to receive a conventional pleated filter therein, and a slot 720 configured to receive the various embodiments of the air filter described herein. FIG. 7B illustrates the conventional pleated filter 715a and the air filter 720a received within their respective slots 715 and 720. The folded extension flap 725 can be seen in this view and show how the extension flap increases the width dimension of the air filter 720a to occupy the larger slot 720. FIG. 7C is merely an enlarge, partial view of FIG. 7B further illustrating the placement of the filter 720a in the slot 720 and the utilization of the folded extension flap 725.

Those skilled in the art to which this application relates will appreciate that other and further additions, deletions, substitutions and modifications may be made to the described embodiments.

What is claimed is:

1. An air filter, comprising:
  a frame having an outer edge joined to opposing inwardly projecting edges, and having a length and a width and at least one foldable extension flap attached to at least one of said opposing inwardly projecting edges of said frame, said foldable extension flap extending along at least one of either of said length or said width, said frame further having at least one outer tab slot located in said outer edge and along said at least one of either of said length or said width, said extension flap having at least one tab located along an edge thereof, said foldable extension flap configured to be folded outwardly from said frame and abut said outer edge when said tab is received within said at least one outer tab slot; and
  a filter membrane contained within said frame.

2. The air filter recited in claim 1, wherein said at least one extension flap is a first extension flap attached to a first inwardly projecting edge and said air filter further comprises a second extension flap attached to an opposing second inwardly projecting edge, wherein said first and second extension flaps are located along said length of said frame.

3. The air filter recited in claim 1, wherein said at least one extension flap is a first extension flap attached to a first inwardly projecting edge and said air filter further comprises a second extension flap attached to an opposing second inwardly projecting edge, wherein said first and second extension flaps are located along said width of said frame.

4. The air filter recited in claim 1, wherein said at least one extension flap is a first extension flap to a first inwardly projecting edge and said air filter further comprises a second extension flap attached to an opposing second inwardly projecting edge, wherein said first and second extension flaps are located along said length and said width of said frame.

5. The air filter recited in claim 1, wherein said filter membrane comprises an aluminum mesh.

6. The air filter recited in claim 5, wherein said aluminum mesh is coated with a titanium oxide.

7. The air filter recited in claim 1, wherein said at least one extension flap includes multiple fold creases formed therein.

8. The air filter recited in claim 1, wherein said at least one extension flap is divided into at least two tab sections and wherein said at least two tab sections are separated by a perforated line configured to thereby allow a width of said at least one extension flap to be adjusted.

9. The air filter recited in claim 1, wherein said frame is configured to be inserted into a filter slot of an air purification system when said extension flap is bent along three crease lines and said tabs are received within said tab slots.

10. The air filter recited in claim 1 wherein said filter membrane comprises a carbon filter, polymer fibrous material or pleated paper filter.

11. A method of fabricating an air filter, comprising:
  forming a frame having an outer edge joined to opposing inwardly projecting edges, and having a length and a width and at least one foldable extension flap attached to at least one of said opposing inwardly projecting edges of said frame, said foldable extension flap extending along at least one side of either said length or said width, said extension flap being configured to be folded outwardly from said frame and abut said outer edge;
  forming at least one outer tab slot in said outer edge and along said at least one of either said length or said width of said frame, said extension flap having at least one tab located along an edge thereof configured to be received within said at least one outer tab slot when said extension flap abuts said outer edge; and
  placing a filter membrane within said frame.

12. The method recited in claim 11, wherein forming said frame having at least one extension flap includes forming first and second extension flaps on said opposing inwardly projecting edges and along said length or said width of said frame.

13. The method recited in claim 11, wherein forming said frame having at least one extension flap includes forming first and second extension flaps on said opposing inwardly projecting edges and along said length and said width of said frame.

14. The method recited in claim 11, wherein placing said filter membrane comprises placing an aluminum mesh within said frame, wherein said aluminum mesh is coated with a titanium oxide.

15. The method recited in claim 11, further comprising forming multiple fold crease lines along a length of said at least one extension flap.

16. The method recited in claim 11, further comprising forming said at least one extension flap such that said at least one extension flap includes a removable section designated by a solid line or perforated line.

17. The method recited in claim 11, wherein forming said frame comprises forming said length and said width of said frame forming said at least one extension flap such that said frame is configured to be inserted into a filter slot of an air purification system when said extension flap is bent along three crease lines and said tabs are received within said tab slots.

18. The air filter recited in claim 11 wherein placing said filter membrane comprises placing a filter membrane comprising carbon, polymer fibrous material, or pleated paper.

19. An air filter, comprising:
a frame having an outer edge joined to opposing inwardly projecting edges, and having a length and a width and at least one foldable extension flap attached to at least one of said opposing inwardly projecting edges of said frame, said foldable extension flap extending along at least one of either of said length or said width, said foldable extension flap having a crease line that extends along a length of said at least one foldable extension flap, said at least one extension flap configured to be folded outwardly from said frame and abut said outer edge when said at least one extension flap is folded along said crease line; and
a filter membrane contained within said frame.

20. The air filter recited in claim 19, further comprising an adhesive strip located along the length of said at least one extension flap and on a surface of said extension flap, wherein said adhesive strip secures said portion of said extension flap to said edge of said frame.

21. The air filter recited in claim 19, wherein said at least one extension flap is divided into at least two tab sections and wherein said at least two tab section are separated by a perforated line configured to thereby allow a width of said at least one extension flap to be adjusted.

* * * * *